2,948,724
Patented Aug. 9, 1960

2,948,724
HALOGENATED DERIVATIVES OF TETRAHYDRO-1-NAPHTHYL CYCLIC AMIDINES

Melville Sahyun and John A. Faust, Santa Barbara, Calif.; said Faust assignor to said Sahyun, doing business as Sahyun Laboratories, Santa Barbara, Calif.

No Drawing. Filed Apr. 21, 1958, Ser. No. 729,558

8 Claims. (Cl. 260—251)

The present invention relates to compositions of matter which are derivatives of tetrahydro - 1 - naphthyl - cyclic amidines and to processes for producing the derivatives.

The present invention resides in the concept of attaching one or more halogen atoms in the 5-, 6-, 7-, or 8-position on the unsaturated portion of the naphthalene moiety of 1,2,3,4-tetrahydro-1-naphthyl cyclic amidines.

The compounds of the present invention have pharmacological properties which indicate their utility as pharmacodynamic agents. The compounds of the present invention produce, in animal organisms, varying responses of the depressor, blood-pressure-lowering, adrenergic blocking, and, cardiac rate decreasing type, depending upon the precise molecular structure within the scope of the claimed subject matter.

Among the free bases of the invention are those represented by the formula:

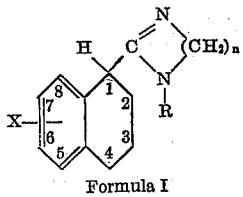

Formula I wherein X represents one or more atoms of the halogens chlorine, bromine, iodine, and fluorine, attached to one or more of the 5-, 6-, 7-, or 8-position carbon atoms of the naphthalene moiety; n is the integer 2 or 3; and R represents a hydrogen atom or a lower-alkyl radical as methyl, ethyl, propyl, butyl or pentyl.

The free bases herein-described and claimed can be employed in the form of their acid-addition salts as the full equivalents of the free bases.

The acids which can be used to prepare acid-addition salts are those which produce, when combined with the free bases, water-soluble salts whose anions are relatively innocuous to animal organisms in effective dosages of the salts, so that the benefical physiological properties inherent in the bases are not vitiated by side-effects ascribable to the anions. Acid addition salts, such as for example, the tartrate, nitrate, sulfate, hydrochloride, hydrobromide, hydroiodide, acetate, et cetera, can be prepared by contacting an ethereal solution of the free imidazoline with the acid and separating the resulting salt.

The present invention further resides in the concept of the process for preparing the compounds of Formula I, as diagrammatically outlined in the step-by-step reaction below, and comprising: converting the halogenated-phenylacetonitrile II with an alkanol to the alkyl-halogenated phenylacetate III; condensing III with an alkyl acrylate to produce the di-alkyl-alpha-(halogenated phenyl) glutarate IV; hydroylzing the glutarate IV to produce the alpha-(halogenated phenyl) glutaric acid V; dehydrating the acid V to produce the alpha-(halogenated phenyl) glutaric anhydride VI; converting the glutaric anhydride VI to the halogenated-4-keto-1,2,3,4-tetrahydro-1-naphthoic acid VII; reducing VII to the halogenated 1,2,3,4-tetrahydro-1-naphthoic acid VIII; converting VIII to the halogenated 1,2,3,4-tetra-hydro-1-naphthoamide IX; dehydrating IX to produce the halogenated 1,2,3,4-tetrahydro-1-naphthonitrile X; and condensing X with an unsubstituted or mono-N-substituted ethylene diamine or 1,3-diamino propane to yield the compound of the invention I, a halogenated 1,2,3,4-tetrahydro-1-naphthylcyclic amidine. The salts of the invention may be readily formed by mixing a solution of the base I of the invention with the appropriate salt forming reagent, such as an ethereal solution of mineral acid.

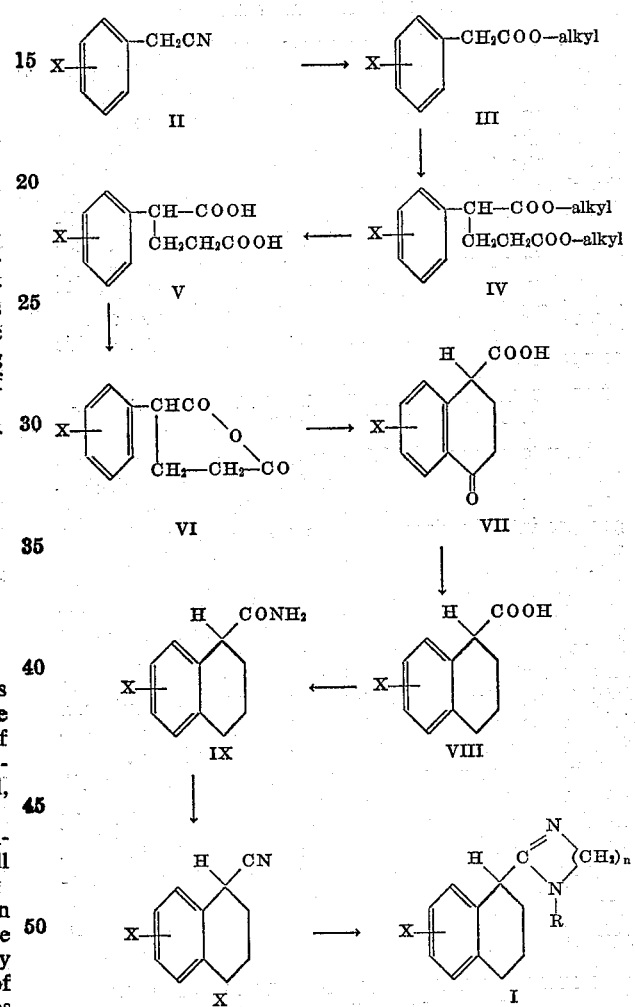

A number of physical embodiments of the invention, in both its compound and process aspects, are disclosed in the following examples:

EXAMPLE 1

The preparation of 2 - (8 - chloro - 1,2,3,4-tetrahydro-1-naphthyl) imidazoline

PART A. PREPARATION OF o-CHLOROPHENYLACETONITRILE (II)

Dissolve 500 grams (3.1 mole) of commercial alpha, ortho-dichlorotoluene in 600 milliliters of ethanol. Dissolve 260 grams (4 moles) of potassium cyanide in 300 milliliters of water and heat the solution. While stirring the hot potassium cyanide solution, add the alpha, ortho-dichlorotoluene solution thereto over a period of 2 hours. Next, stir the mixture while heating it to maintain reflux for 5 hours. Thereafter filter the mixture to separate the precipitated potassium chloride. Distill the filtrate to remove most of the alcohol and leave a residue. Dissolve the residue in a two-phase mixture of water and chloroform. Then separate the water layer and discard it. Distill the chloroform layer to obtain 415 grams (88 percent yield) of colorless product, o-chlorophenyl acetonitrile, boiling at 106–111 degrees centigrade under a reduced atmospheric pressure of 2 millimeters of mercury. For this compound, the literature reports a boiling range of 123–125 degrees centigrade under a reduced atmospheric pressure of 11 millimeters of mercury in The Journal of The Chemical Society, 1948, page 1251; and a boiling point of 127 degrees centigrade under a reduced atmospheric pressure of 7 millimeters of mercury in Chemical Abstracts, volume 46, column 11149.

PART B. PREPARATION OF ETHYL-o-CHLOROPHENYLACETATE (III)

Mix 152 grams (1 mole) of o-chlorophenylacetonitrile (II), 450 grams of an aqueous solution containing 95 percent ethanol and 450 grams of an aqueous solution containing 96 percent sulfuric acid. Stir and reflux the mixture for 4 hours. Thereafter, pour the mixture onto ice. Extract the mixture with chloroform. Separate the chloroform portion and distill it to yield 182 grams (91 percent yield) of ethyl-o-chlorophenylacetate, boiling at 100–103 degrees centigrade under a reduced atmospheric pressure of 1.3–1.5 millimeters of mercury. Beilstein's Handbuch der Organischem Chemie reports a boiling point of 134 degrees centigrade under an atmospheric pressure of 23 millimeters of mercury for this compound.

PART C. PREPARATION OF METHYL ETHYL ALPHA-(o-CHLOROPHENYL) GLUTARATE (IV)

Form a slurry of 99.3 grams (0.5 mole) of ethyl-o-chlorophenylacetate (III) and 3.5 grams of alcohol-free sodium methylate in a sealed flask. Introduce nitrogen gas into the flask until the atmosphere in the flask above the slurry is entirely composed of the nitrogen gas. Stir the slurry and add dropwise 43.1 grams (0.5 mole) of methyl acrylate over a period of 30 minutes, while maintaining the temperature of the mixture between about 30 degrees centigrade and about 40 degrees centigrade. Thereafter, stir the mixture for an additional hour. Then add 10 milliliters of glacial acetic acid to the mixture. Thereafter, pour the mixture into water. A water-immiscible oil separates from the aqueous mixture.

Mix chloroform with the mixture to extract the oil. Separate the chloroform layer from the aqueous layer. Distill the chloroform portion through an 8-inch Vigreux column to yield 110 grams (77 percent yield) of methylethylalpha-(o-chlorophenyl) glutarate, boiling at 150–155 degrees centigrade under a reduced atmospheric pressure of 1.2–1.5 millimeters of mercury and having an $N^{21}$ of 1.5100.

PART D. PREPARATION OF ALPHA-(o-CHLOROPHENYL) GLUTARIC ACID (V)

Mix 102 grams (0.36 mole) of methyl ethyl alpha-(o-chlorophenyl) glutarate (IV), 40 grams (1 mole) of sodium hydroxide, 400 milliliters of water and 400 milliliters of isopropyl alcohol. Reflux the mixture for 15 hours to form a solution. Thereafter, distill the solution to remove most of the alcohol. Then dilute the remaining solution with water. Extract the solution with chloroform to clarify the aqueous portion by the removal of chloroform-soluble materials. Separate the chloroform layer and discard it. Acidify the aqueous layer to precipitate a pure white solid. Recrystallize the solid from dilute-acetic acid. Filter and dry the solid to yield 79 grams of alpha-(o-chlorophenyl) glutaric acid (90 percent yield), melting at 144–145 degrees centigrade. Analyze a sample as follows: Neutralization equivalent calculated for the product's empirical formula of $C_{11}H_{11}ClO_4$ is 243. The neutralization equivalent found is 245.

PART E. PREPARATION OF ALPHA-(o-CHLOROPHENYL) GLUTARIC ANHYDRIDE (VI)

Dissolve 61 grams (0.25 mole) of alpha-(o-chlorophenyl) glutaric acid (V) in 200 milliliters of acetic anhydride. Reflux the solution for 4 hours. Thereafter, distill the mixture to yield an oil. Next, the oil solidifies. Recrystallize the solid from chloroform. There is produced 48 grams (87 percent yield) of alpha-(o-chlorophenyl) glutaric anhydride melting at 132–133 degrees centigrade. Analyze a sample of the product as follows:

The saponification equivalent calculated for the empirical formula of the product $C_{11}H_9ClO_3$ is 225. The saponification equivalent found on analysis is 224.

PART F. PREPARATION OF 8-CHLORO-4-KETO-1,2,3,4-TETRAHYDRO-1-NAPHTHOIC ACID (VII)

Dissolve 67 grams (0.5 mole) of anhydrous aluminum chloride in 450 milliliters of nitrobenzene. To the solution, add 52 grams (0.25 mole) of alpha-(o-chlorophenyl) glutaric anhydride (VI). Warm the homogeneous solution thus formed to maintain the temperature at about 50–60 degrees centigrade for two and one-half hours. Thereafter, pour the solution into dilute hydrochloric acid. Remove the nitrobenzene from the solution by steam distillation. Concentrate the residual solution remaining after the steam distillation until the residual solution has the appearance of an oil. Extract the oil with diethyl ether and separate the ether phase. Wash the ether phase with water and dry it. Remove the ether by distillation to leave a residue of 55 grams of crude 8-chloro-4-keto-1,2,3,4-tetrahydro-1-naphthoic acid as a pale yellow oil which cannot be induced to crystallize.

Mix the pale yellow product with 2,4-dinitrophenylhydrazine to yield the 2,4-dinitrophenylhydrazone of 8-chloro-4-keto-1,2,3,4-tetrahydro-1-naphthoic acid, an orange solid melting at 260–261 degrees centigrade (with decomposition). Analyze this condensation product as follows:

For an empirical formula of $C_{17}H_{12}ClN_4O_6$ the calculated neutralization equivalent is 404. The neutralization equivalent found on analysis is 405.

PART G. PREPARATION OF 8-CHLORO-1,2,3,4-TETRAHYDRO-1-NAPHTHOIC ACID (VIII)

Place 50 milliliters of aqueous solution containing 85 percent hydrazine hydrate in a flask. Dissolve 55 grams (0.24 mole) of the oily acid, 8-chloro-4-keto-1,2,3,4-tetrahydro-1-naphthoic acid (VII) in the hydrazine hydrate solution. Reflux the combined solution thus formed for 15 minutes. Thereafter add 30 grams of potassium hydroxide and 175 milliliters of ethylene glycol to the solution and reflux the mixture at about 140 degrees centigrade for an additional 2 hours. Next distill the solution until the reflux temperature reaches 180 degrees centigrade. At this point discontinue distillation and reflux the remaining solution for an additional 3 hours. Thereafter, pour the mixture into 500 milliliters of water. Add charcoal to the mixture, filter and acidify the mixture. A pale yellow solid precipitates. Filter and dry the solid to produce 22 grams (44 percent yield) of the product, 8-chloro-1,2,3,4-tetrahydro-1-naphthoic acid melting at 159–160 degrees centigrade. Concentrate the filtrate to obtain an additional 13 grams of product. Analyze the product as follows:

Based on the empirical formula of $C_{11}H_{11}ClO_2$, the neutralization equivalent calculated for the product is 211. The neutralization equivalent found on analysis is 214.

PART H. PREPARATION OF 8-CHLORO-1,2,3,4-TETRAHYDRO-1-NAPHTHOAMIDE (IX)

Mix 22 grams (0.1 mole) of 8-chloro-1,2,3,4-tetrahydro-1-naphthoic acid, 50 milliliters of thionyl chloride and 50 milliliters of benzene. Reflux the mixture for 3 hours and thereafter distill to remove the excess thionyl chloride and benzene. Dissolve the oily residue remaining after distillation which contains the acid chloride in about 50 milliliters of dioxane. Add this solution to a stirred mixture of 100 milliliters of aqueous 28 percent ammonium hydroxide and ice. The solid amide separates. Filter and dry it to produce 22 grams (100 percent yield) of crude 8-chloro-1,2,3,4-tetrahydro-1-naphthoamide. Recrystallize the amide from dilute methanol to achieve a final product having a melting range of 182–184 degrees centigrade. Analyze the product as follows:

Based on an empirical formula of the product of $C_{11}H_{12}ClNO$ the calculated percent of nitrogen by weight is 6.68. The percent nitrogen by weight found is 6.57.

PART I. PREPARATION OF 8-CHLORO-1,2,3,4-TETRA-HYDRO-1-NAPHTHONITRILE (X)

Dissolve 21 grams (0.1 mole) of 8-chloro-1,2,3,4-tetrahydro-1-naphthoamide (IX) and 50 milliliters of thionyl chloride in 50 milliliters of benzene. Reflux the solution for 12 hours. Thereafter filter the solution to remove any precipitated solid materials. Fractionally distill the filtrate under reduced pressure to obtain a yield of 14 grams (74 percent yield) of a fraction boiling at 129–132 degrees centigrade (under a reduced pressure of 0.5 millimeter of mercury). Recrystallize this fraction from heptane solvent to obtain a final solid product having a melting point of 62–63 degrees centigrade. Analyze the product as follows:

On the basis of the empirical formula $C_{11}H_{10}ClN$ for the product, the calculated percent of nitrogen by weight is 7.32. The percent nitrogen by weight found on analysis is 7.34.

PART J. PREPARATION OF 2-(8-CHLORO-1,2,3,4-TETRAHYDRO-1-NAPHTHYL)IMIDAZOLINE (I)

Mix 6 grams (0.031 mole) of 8-chloro-1,2,3,4-tetrahydro-1-naphthonitrile (X) and 16 grams (0.064 mole) of ethylene diamine monopara-toluenesulfonate. Heat the mixture to maintain the temperature at 200–210 degrees centigrade for 2 hours. At the end of this period the evolution of ammonia gas has ceased. Cool the reaction mixture to form a solid mass. Dissolve the solid mass in dilute hydrochloric acid. Filter the solution to remove a small amount of solid material. Add charcoal to the filtrate, filter and make it alkaline with sodium hydroxide to precipitate a solid. Filter the solid and recrystallize it several times from ethanol solvent. Obtain a yield of 5 grams of 2-(8-chloro-1,2,3,4-tetrahydro-1-naphthyl) imidazoline melting at 203–204 degrees centigrade. Analyze the product as follows:

On the basis of an empirical formula of the product $C_{13}H_{15}ClN_2$, the calculated neutralization equivalent is 235 and the percent of nitrogen is 11.94 by weight. Analysis of the product finds a neutralization equivalent of 236 and a percent of nitrogen by weight of 11.77.

EXAMPLE 2

*The preparation of 2-(8-chloro-1,2,3,4-tetrahydro-1-naphthyl)-1-methylimidazoline sulfate*

Mix 2.8 grams (0.015 mole) of 8-chloro-1,2,3,4-tetrahydro-1-naphthonitrile (prepared as set forth in Part I of Example 1), 0.6 gram (0.008 mole) of N-methyl-ethylene diamine and 3.4 grams (0.008 mole) of N-methyl-ethylene diamine bis-p-toluene-sulfonate. Heat the mixture at about 200 degrees centigrade for 2 hours. Thereafter, cool the mixture and treat it with dilute hydrochloric acid. Filter the mixture to remove solid material. Make the filtrate alkaline with sodium hydroxide with resulting separation of an oil. Extract the oil from the mixture with ether. Separate the ether solution and dry it. Treat the ether solution with sulfuric acid to precipitate an oily product which subsequently solidifies. Filter the solid and recrystallize it from a mixture of ethanol and ether. Obtain the product, 0.9 gram of 2-(8-chloro-1,2,3,4-tetrahydro-1-naphthyl)-1-methylimidazoline sulfate melting at 251–253 degrees centigrade. Concentrate the previous ether mother liquor by distillation to obtain a second crop of 1.2 grams of product.

Analyze the product as follows:

On the basis of an empirical formula of the product of $C_{14}H_{17}ClN_2 \cdot H_2SO_4$, the percent of nitrogen by weight is 8.08. Analysis finds a percent of nitrogen by weight of 7.94.

EXAMPLE 3

*Preparation of 2-(8-chloro-1,2,3,4-tetrahydro-1-naphthyl) 1,4,5,6-tetrahydro pyrimidine*

Mix 3.8 grams (0.02 mole) of 8-chloro-1,2,3,4-tetrahydro-1-naphthonitrile (prepared as set forth in Part I of Example 1), 0.9 gram (0.012 mole) of 1,3-diaminopropane and 5 grams (0.012 mole) of 1,3-diaminopropane bis-p-toluenesulfonate. Heat the mixture for 2 hours at about 200 degrees centigrade. Cool the reaction mixture thereafter. Next dissolve the mixture in dilute hydrochloric acid. Filter the solution to remove any solid material. Extract the solution with ether to remove insoluble oil. Separate the ether and aqueous phases. Make the separated aqueous solution alkaline with the resulting precipitation of a solid. Filter the aqueous solution to remove the solid. Thereafter, recrystallize the solid first from heptane solvent and then from dilute ethanol solvent, to produce 2.1 grams of 2-(8-chloro-1,2,3,4 - tetrahydro - 1 - naphthyl) 1,4,5,6 - tetrahydropyrimidine melting at 172–173 degrees centigrade.

Analyze the product as follows:

Based on an empirical formula of the product $C_{14}H_{17}ClN_2$, the product has a percent nitrogen by weight of 11.26 and a neutralization equivalent of 249. Analysis of the product finds a percent nitrogen by weight of 11.12 and a neutralization equivalent of 250.

EXAMPLE 4

*Preparation of 2-(8-chloro-1,2,3,4-tetrahydro-1-naphthyl)-1-methyl-1,4,5,6-tetrahydropyrimidine*

Mix 3.1 grams (0.016 mole) of 8-chloro-1,2,3,4-tetrahydro-1-naphthonitrile (prepared as set forth in Part I of Example 1), 0.9 gram (0.01 mole) of N-methyl-1,3-diaminopropane and 4.3 grams (0.01 mole) of N-methyl-1,3-diaminopropane bis-p-toluene sulfonate. Heat the mixture at about 200 degrees centigrade for 2 hours. Thereafter cool the mixture. Dissolve the mixture in dilute hydrochloric acid. Clarify the solution by extracting it with ether. Separate the ether and aqueous phases. Treat the separated aqueous solution with charcoal, filter it and make it alkaline. An oily base precipitates. Extract the oily base with ether. Separate the ether phase and concentrate it by distillation. After concentration, an oil is formed which solidified. Recrystallize the oil from heptane solvent to obtain 0.7 gram of 2-(8-chloro-1,2,3,4 - tetrahydro - 1 - naphthyl) - 1 - methyl - 1,4,5,6-tetrahydropyrimidine melting at 114–115 degrees centigrade.

Analyze the product as follows:

Based on the product's empirical formula $C_{15}H_{19}ClN_2$, there is calculated a nitrogen percent by weight of 10.66 and a neutralization equivalent of 263. Analysis finds a nitrogen percent by weight of 10.45 and a neutralization equivalent of 263.

EXAMPLE 5

*Preparation of 2-(6-chloro-1,2,3,4-tetrahydro-1-naphthyl) imidazoline and its hydrochloride salt*

PART A. PREPARATION OF ETHYL-PARA-CHLOROPHENYLACETATE (III)

Mix 600 cubic centimeters of ethanol and 150 cubic centimeters of 40 percent aqueous sodium hydroxide. Dissolve 304 grams (2 moles) of commercial para-chlorophenylacetonitrile (II) in the mixture. Reflux the solution for 14 hours and thereafter distill to remove most of the alcohol. Dissolve the residue remaining after distillation in water. Acidify the solution to precipitate para-chlorophenylacetic acid melting at 104–105 degrees centigrade. Filter the precipitate and dry it. Beilstein's Handbuch der Organischen Chemie, vol. IX, page 448, reports a melting point of 105–106 degrees centigrade for this acid. Esterify the dry acid with ethanol and produce 332 grams (67 percent yield) of ethyl-para-chlorophenylacetate boiling at 145–148 degrees centigrade under reduced pressure of 20 millimeters of mercury. Beilstein's Handbuch der Organischen Chemie, vol. IX, page 448, reports a boiling point of 260 degrees centigrade under pressure 760 millimeters of mercury for this ester.

PART B. PREPARATION OF METHYL-ETHYL-ALPHA-(PARA-CHLOROPHENYL) GLUTARATE (IV)

Mix 99.3 grams (0.5 mole) of para-chlorophenylacetate (III) and 3.5 grams of alcohol-free sodium methylate. Place the slurry thus formed in a sealed flask. Introduce nitrogen gas into the flask and expel other gases to form an atmosphere of nitrogen above the slurry. While stirring the slurry, dropwise add 43.1 grams (0.5 mole) of methylacrylate to the slurry over a period of 45 minutes while maintaining the temperature of the slurry between about 30 and 40 degrees centigrade. Thereafter stir the mixture for an additional hour. Next add 10 milliliters of acetic acid to the mixture and pour the mixture into water. An oil then separates from the aqueous phase. Extract the oil from the mixture with ether. Separate the ether phase and dry it. Distill the separated ether solution to produce 87 grams (53 percent yield) of methyl-ethyl-alpha-(para-chlorophenyl)glutarate boiling at 163–167 degrees centigrade under a reduced pressure of 2 millimeters of mercury.

Analyze the product as follows:

Based on an empirical formula $C_{14}H_{17}O_4Cl$ for the product, the calculated saponification equivalent is 145. Analysis finds a saponification equivalent of 143.

PART C. PREPARATION OF ALPHA-(PARA-CHLOROPHENYL) GLUTARIC ACID (V)

Mix 47 grams (0.165 mole) of methyl-ethyl-alpha-(para-chlorophenyl) glutarate (IV), 20 grams (0.5 mole) of sodium hydroxide and 300 milliliters of water. Reflux the mixture until a substantially clear solution is formed. Cool the solution and acidify it to precipitate an oil. The solid subsequently solidifies. Filter to remove the solidified oil. Recrystallize the solid from a mixture of ether and petroleum ether to produce 43 grams of alpha-(para-chlorophenyl) glutaric acid (95 percent yield) melting at 104–105 degrees centigrade. Analyze the product as follows:

Based on the product's emprical formula $C_{11}H_{11}ClO_4$, the calculated neutralization equivalent is 243. Analysis found a neutralization equivalent of 242.

PART D. PREPARATION OF ALPHA-(PARA-CHLOROPHENYL) GLUTARIC ANHYDRIDE (VI)

Dissolve 36 grams of alpha-(para-chlorophenyl)glutaric acid (V) in 150 milliliters of acetic anhydride. Reflux the solution for 3 hours; thereafter remove volatile components by distillation and leave a residual oil which subsequently crystallizes. Recrystallize the solid from chloroform solvent. Filter and dry the product to produce 22 grams (66 percent yield) of alpha-(para-chlorophenyl) glutaric anhydride, melting at 131–132 degrees centigrade. Analyze the product as follows:

Based on the product's empirical formula $C_{11}H_9ClO_3$, the calculated saponification equivalent is 225. Analysis finds a saponification equivalent of 222.

PART E. PREPARATION OF 6-CHLORO-4-KETO-1,2,3,4-TETRAHYDRO-1-NAPHTHOIC ACID (VII)

Dissolve 67 grams (0.5 mole) of anhydrous aluminum chloride in 350 milliliters of nitrobenzene. Add 51 grams (0.23 mole) of alpha-(para-chlorophenyl) glutaric anhydride (VI) to the solution to form a mixture. Stir the mixture for 14 hours while maintaining the temperature at 60–70 degrees centigrade. Thereafter, pour the red solution thus formed into dilute hydrochloric acid. Remove the nitrobenzene from the mixture by steam distillation. The residual mixture remaining after steam distillation contains a dark oil. Extract this oil with ether. Separate the ether solution and wash it with water. Dry the ether solution and distill it to remove ether and leave a residual dark viscous oil, the crude 6-chloro-4-keto-1,2,3,4-tetrahydro-1-naphthoic acid weighing 44 grams.

PART F. PREPARATION OF 6-CHLORO-1,2,3,4-TETRAHYDRO-1-NAPHTHOIC ACID (VIII)

Mix the 44 grams of crude 6-chloro-4-keto-1,2,3,4-tetrahydro-1-naphthoic acid (VII) obtained in Part E above with 50 milliliters of 85 percent aqueous hydrazine hydrate. Reflux the mixture for one hour. Dissolve 30 grams of potassium hydroxide in 150 milliliters of ethylene glycol. Add this solution to the reaction mixture. Heat the solution thus formed at about 170 degrees centigrade for 2 hours. Thereafter, pour the solution into water. Acidify the mixture with the resultant precipitation of a dark oil. Extract the oil with ether. Separate the ether phase and remove the ether by distillation. Mix the residue with ethanol and sulfuric acid and heat the mixture. Fractionally distill the mixture to obtain 20 grams of the ester, ethyl-6-chloro-1,2,3,4-tetrahydro-1-naphthoate boiling at 152–154 degrees centigrade under a reduced pressure of 0.5 millimeter of mercury. Add aqueous sodium hydroxide to the ester and heat the mixture. After hydrolysis, separate 17 grams of 6-chloro-1,2,3,4-tetrahydro-1-naphthoic acid. Recrystallize a sample of this product from dilute acetic acid and determine its melting point to be 109–110 degrees centigrade.

Analyze the product as follows:

Based on the product empirical formula of $C_{11}H_{11}ClO_2$, the calculated neutralization equivalent is 211. Analysis finds the neutralization equivalent to be 209.

PART G. PREPARATION OF 6-CHLORO-1,2,3,4-TETRAHYDRO-1-NAPHTHOAMIDE (IX)

Mix 16 grams of crude 6-chloro-1,2,3,4-tetrahydro-1-naphthoic acid (VIII), 35 milliliters of benzene and 35 milliliters of thionyl chloride. Reflux the mixture for 2 hours. Thereafter concentrate the mixture by distillation to yield a residual oil. Add the residual oil slowly to an excess quantity of cold ammonium hydroxide. A solid subsequently precipitates. Filter the solid and dry it. Recrystallize the solid from dilute ethanol solvent to produce 8 grams of 6-chloro-1,2,3,4-tetrahydro-1-naphthoamide melting at 181–183 degrees centigrade.

Analyze the product as follows:

Based on a product empirical formula of $C_{11}H_{12}ClNO$, the calculated percent of nitrogen by weight is 6.68. Analysis finds the nitrogen percent by weight of 6.43.

PART H. PREPARATION OF 6-CHLORO-1,2,3,4-TETRAHYDRO-1-NAPHTHONITRILE (X)

Add 7.5 grams of 6-chloro-1,2,3,4-tetrahydro-1-naphthoamide to 20 milliliters of thionyl chloride with an immediate vigorous reaction. Thereafter reflux the mixture for one hour. Next, distill the mixture to yield 4 grams of 6-chloro-1,2,3,4-tetrahydro-1-naphthonitrile boiling at 130–132 degrees centigrade under a reduced pressure of 0.5 millimeter of mercury. Subsequently the oil solidifies. Recrystallize a sample of the solidified oil from petroleum ether to produce a final sample having a melting point of 54–55 degrees centigrade. Analyze the product as follows:

Based on an empirical formula of $C_{11}H_{10}ClN$, percent nitrogen by weight is 7.32. Analysis finds a percent nitrogen by weight of 7.26.

PART I. PREPARATION OF 2-(6-CHLORO-1,2,3,4-TETRAHYDRO-1-NAPHTHYL)IMIDAZOLINE (I) AND ITS HYDROCHLORIDE SALT

Mix 2.7 grams (0.014 mole) of 6-chloro-1,2,3,4-tetrahydro-1-naphthonitrile (X) and 5.1 grams (0.022 mole) of ethylene diamine mono-para-toluene sulfonate. Heat the mixture at about 200 degrees centigrade for about 2 hours. Thereafter cool the mass. Dissolve the cooled mass in dilute hydrochloric acid. Treat the hydrochloride solution with charcoal and filter it. Next, make the filtrate alkaline. The solid base precipitates. Filter and dry the base and thereafter recrystallize it twice from ethanol solvent to produce 1.8 grams of 2-(6-chloro-1,2,3,4-tetrahydro-1-naphthyl)imidazoline melting at 167–173 degrees centigrade. Analyze the product as follows:

Based on the product empirical formula $C_{13}H_{15}ClN_2$, there is calculated a neutralization equivalent of 235 and a percent nitrogen by weight of 11.94. Analysis finds a neutralization equivalent of 236 and a percent nitrogen by weight of 11.64.

To prepare the hydrochloride salt, dissolve the base 2-(6-chloro-1,2,3,4-tetrahydro-1-naphthyl)imidazoline in ethanol solvent. Add a solution of hydrogen chloride in ether with the subsequent precipitation of the salt. Filter the salt and recrystallize it from a mixture of ethanol and ether. Obtain the salt, 2-(6-chloro-1,2,3,4-tetrahydro-1-naphthyl)imidazoline hydrochloride as pure white needles, melting at 228–229 degrees centigrade.

Analyze the product as follows:
Based on a product empirical formula of $$C_{13}H_{15}ClN_2 \cdot HCl$$

there is calculated a percent nitrogen by weight of 10.33 and a percent chloride ion by weight of 13.07. Analysis finds a percent nitrogen by weight of 10.19 and a percent chloride ion by weight of 13.13.

EXAMPLE 6

*Preparation of 2-(8-bromo-1,2,3,4-tetrahydro-1-naphthyl imidazoline*

PART A. PREPARATION OF ORTHO-BROMOPHENYL-ACETONITRILE (II)

Dissolve a quantity of ortho-bromotoluene in carbon tetrachloride. Add bromine to the solution to produce crude ortho-bromobenzyl bromide. Separate the ortho-bromobenzyl bromide and dissolve it in a quantity of dilute ethanol. Add an excess of potassium cyanide dissolved in dilute ethanol. Stir the mixture under reflux for about 2 hours. Thereafter, filter the mixture to remove the precipitated potassium chloride. Thereafter distill the filtrate to remove most of the alcohol therefrom. Dissolve the residue remaining after distillation in a mixture of water and chloroform. Separate the chloroform phase. Distill the chloroform from the solution to produce a 74 percent yield or ortho-bromophenylacetonitrile boiling at 110–116 degrees centigrade under a pressure of 1.5 millimeters of mercury. Beilstein's Handbuch der Organischen Chemie, vol. IX, page 181, reports the boiling point of this product as 145–147 degrees centigrade at a pressure of 13 millimeters of mercury.

PART B. PREPARATION OF ETHYL-ORTHO-BROMOPHENYLACETATE (III)

Mix one part of ortho-bromophenylacetonitrile (II), an excess of 95 percent aqueous ethanol and an excess of sulfuric acid. Stir the mixture and reflux it for 4 hours. Thereafter pour the mixture onto ice. An oil separates from the aqueous phase. Extract the oil with chloroform. Separate the chloroform solution and distill to remove chloroform and produce a 76 percent yield of ethyl-ortho-bromophenylacetate boiling at 110–113 degrees centigrade under a pressure of 2 millimeters of mercury and melting at 30–33 degrees centigrade. Chemical Abstracts, vol. 38, column 2648, 1944, reports this compound as having a boiling point of 114 degrees centigrade at a pressure of 4 millimeters of mercury and melting at 35–36 degrees centigrade.

PART C. PREPARATION OF METHYL-ETHYL-ALPHA-(ORTHO-BROMOPHENYL) GLUTARATE (IV)

Condense ethyl-ortho-bromophenylacetate (III) with methyl acrylate in the presence of sodium methylate in the manner similar to that described in Example 5, to produce 66 percent yield of methyl-ethyl-alpha-(ortho-bromophenyl) glutarate, boiling at 155–159 degrees centigrade at a pressure of 1.5 millimeters of mercury.

PART D. PREPARATION OF ALPHA-(ORTHO-BROMOPHENYL) GLUTARIC ACID (V)

Hydrolyze one part of methyl-ethyl-alpha-(ortho-bromophenyl) glutarate under alkaline conditions in a manner similar to that disclosed in the foregoing Example 5 to product a crude yield of 100 percent of alpha-(ortho-bromophenyl) glutaric acid. Recrystallize the crude acid from dilute acetic acid to achieve a purified product having a melting range of 139–140 degrees centigrade.

Analyze the product as follows:
Based on the empiral formula for the product of $$C_{11}H_{11}BrO_4$$

the calculated neutralization equivalent is 287. Analysis finds a neutralization equivalent of 287.

PART E. PREPARATION OF ALPHA-(ORTHO-BROMOPHENYL) GLUTARIC ANHYDRIDE (VI)

Dehydrate alpha-(ortho-bromophenyl) glutaric acid employing acetic anhydride in the manner set forth in Example 5 to achieve a yield of 74 percent of alpha-(ortho-bromophenyl) glutaric anhydride melting at 107–108 degrees centigrade. Recrystallize the product from chloroform.

Analyze the product as follows:
Based on an empirical formula of $C_{11}H_9BrO_3$, the saponification equivalent calculated is 269. Analysis finds a saponification equivalent of 262.

PART F. PREPARATION OF 8-BROMO-4-KETO-1,2,3,4-TETRAHYDRO-1-NAPHTHOIC ACID (VII)

Mix 53.8 grams (0.2 mole) of alpha-(ortho-bromophenyl) glutaric anhydride (VI), 66.6 grams (0.5 mole) of aluminum chloride and 400 milliliters of nitrobenzene. Stir the mixture for 3 hours while maintaining the temperature at 60 degrees centigrade. Thereafter, allow the mixture to remain overnight at about 25 degrees centigrade. Next pour the red mixture produced into a dilute hydrochloric acid solution. Remove the nitrobenzene from the mixture by steam distillation. A red oil remains in the reside after steam distillation. Extract the red oil with ether. Extract the ether solution with aqueous dilute sodium hydroxide. Separate the aqueous phase and acidify it with the resulting separation of an oil. Extract the oil with ether. Evaporate the ether from the ether solution to leave a residue of a red oil weighing 46 grams. Use this acid, 8-bromo-4-keto-1,2,3,4-tetrahydro-1-naphthoic acid directly in the part G of this example.

Condense 2,4-dinitrophenylhydrazine with the acid product of the previous paragraph to product the 2,4-dinitrophenylhydrazone of 8-bromo-4-keto-1,2,3,4-tetrahydro-1-naphthoic acid, melting at 269–270 degrees centigrade (with decomposition).

PART G. PREPARATION OF 8-BROMO-1,2,3,4-TETRAHYDRO-1-NAPHTHOIC ACID (VIII)

Mix 44 grams of 8-bromo-4-keto-1,2,3,4-tetrahydro-1-naphthoic acid (VII), 50 milliliters of 95 percent aqueous hydrazine hydrate, and 15 milliliters of water. Reflux the mixture for 15 minutes. Dissolve 15 grams of potassium hydroxide in 60 milliliters of ethylene glycol. Add this solution to the reaction mixture to produce a combined solution. Reflux the combined solution for 3.5 hours. Distill the solution until the internal temperature in the distillation flask reaches 180 degrees centgrade. Maintain the solution at 180 degrees centigrade for 1 hour. Thereafter cool the mixture and pour it into water to form a dark solution. Acidify the dark solution to precipitate a brown solid. Recrystallize the solid from dilute acetic acid to produce 21 grams of solid melting at 181–183 degrees centigrade. Further recrystallize the solid twice from dilute acetic acid to produce 8-bromo-1,2,3,4-tetrahydro-1-naphthoic acid melting at 183–184 degrees centigrade.

Analyze the product as follows:

Based on a product empirical formula $C_{11}H_{11}BrO_2$, the calculated neutralization equivalent is 255. Analysis finds neutralization equivalent of 261.

PART H. PREPARATION OF 8-BROMO-1,2,3,4-TETRA-HYDRO-1-NAPHTHOAMIDE (IX)

Mix 20 grams of 8-bromo-1,2,3,4-tetrahydro-1-naphthoic acid (VIII), 25 milliliters of thionyl chloride and 50 milliliters of benzene. Reflux the mixture for 2 hours. Next, remove the solvent by distillation. Add the residue remaining after distillation to an excess of iced 28 percent aqueous ammonia. Filter the solid from the mixture. Recrystallize the solid from dilute ethanol solvent to produce 19 grams of 8-bromo-1,2,3,4-tetrahydro-1-naphthoamide melting at 173–175 degrees centigrade.

Analyze the product as follows:

Based on a product empirical formula of $C_{11}H_{12}BrNO$, the calculated percent of nitrogen by weight is 5.51. Analysis finds a nitrogen percent by weight of 5.96.

PART I. PREPARATION OF 8-BROMO-1,2,3,4-TETRA-HYDRO-1-NAPHTHONITRILE (X)

Mix 18 grams of crude 8-bromo-1,2,3,4-tetrahydro-1-naphthoamide (IX), 20 milliliters of thionyl chloride and 30 milliliters of benzene. Reflux the mixture for 4 hours. Thereafter, filter the mixture to remove any solid material. Distill the filtrate to obtain 13.5 grams of a yellow oil boiling at 141–144 degrees centigrade under a pressure of 0.5 millimeter of mercury. The oil subsequently solidifies. Recrystallize the solidified oil from heptane solvent to produce a final product, 8-bromo-1,2,3,4-tetrahydro-1-naphthonitrile melting at 70–71 degrees centigrade.

Analyze the product as follows:

Based on the product empirical formula $C_{11}H_{10}BrN$, the calculated percent of nitrogen by weight is 5.93. Analysis finds a percent of nitrogen by weight of 5.40.

PART J. PREPARATION OF 2-(8-BROMO-1,2,3,4-TETRA-HYDRO-1-NAPHTHYL)-IMIDAZOLINE (I)

Mix 4.8 grams (0.02 mole) of 8-bromo-1,2,3,4-tetrahydro-1-naphthonitrile (X) and 7.5 grams (0.032 mole) of ethylene diamine monopara-toluenesulfonate. Heat the mixture to about 200 degrees centigrade and maintain it at this temperature for 2 hours. Thereafter, cool the mixture. Next, add dilute hydrochloric acid to the mixture. Filter the mixture to remove solid material. Make the filtrate alkaline with the resulting precipitation of the solid imidazoline base. Filter the mixture to separate the solid base. Recrystallize the base from ethanol solvent to produce 3.5 grams of 2-(8-bromo-1,2,3,4-tetrahydro-1-naphthyl) imidazoline, melting at 209–210 degrees centigrade.

Analyze the product as follows:

Based on the product empirical formula $C_{13}H_{15}BrN_2$, the calculated percent nitrogen by weight is 10.04 and the calculated neutralization equivalent is 279. Analysis of the product finds a percent nitrogen by weight of 9.82 and a neutralization equivalent of 284.

The invention can be embodied in other specific forms without departing from the spirit or essential characteristics thereof. The foregoing physical embodiments are therefore to be considered in all respects illustrative and not restrictive, the scope of the invention being indicated by the appended claims rather than by the foregoing description, and all changes which come within the meaning and range of equivalency of the claims are therefore intended to be embraced therein.

We claim:

1. Halogenated 1,2,3,4-tetrahydro-1-naphthyl cyclic amidines having the formula:

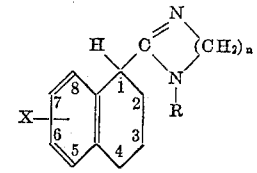

wherein X represents a halogen atom selected from the group consisting of chlorine and bromine; R is selected from the group consisting of the hydrogen atom and lower alkyl radicals; and $n$ is an integer from 2 to 3 inclusive.

2. Non-toxic acid addition salts of the compounds claimed in claim 1.

3. 2 - (8 - chloro - 1,2,3,4 - tetrahydro - 1 - naphthyl)-imidazoline.

4. 2 - (8 - chloro - 1,2,3,4 - tetrahydro - 1 - naphthyl)-1-methyl imidazoline sulfate.

5. 2 - (8 - chloro - 1,2,3,4 - tetrahydro - 1 - naphthyl)-1,4,5,6-tetrahydro-pyrimidine.

6. 2 - (8 - chloro - 1,2,3,4 - tetrahydro - 1 - naphthyl)-1-methyl-1,4,5,6-tetrahydro-pyrimidine.

7. 2 - (6 - chloro - 1,2,3,4 - tetrahydro - 1 - naphthyl)-imidazoline.

8. 2 - (8 - bromo - 1,2,3,4 - tetrahydro - 1 - naphthyl)imidazoline.

References Cited in the file of this patent

UNITED STATES PATENTS

| | | |
|---|---|---|
| 2,731,471 | Synerholm et al. | Jan. 17, 1956 |
| 2,824,120 | Buckley | Feb. 8, 1958 |